(12) United States Patent
Watanabe et al.

(10) Patent No.: US 10,760,673 B2
(45) Date of Patent: Sep. 1, 2020

(54) PLANETARY ROLLER TRANSMISSION

(71) Applicant: JTEKT CORPORATION, Osaka-shi, Osaka (JP)

(72) Inventors: Hajime Watanabe, Kashiwara (JP); Yuichi Matsumoto, Nishimuro-gun (JP)

(73) Assignee: JTEKT CORPORATION, Osaka-shi (JP)

( * ) Notice: Subject to any disclaimer, the term of this patent is extended or adjusted under 35 U.S.C. 154(b) by 92 days.

(21) Appl. No.: 16/163,895

(22) Filed: Oct. 18, 2018

(65) Prior Publication Data
US 2019/0120367 A1 Apr. 25, 2019

(30) Foreign Application Priority Data
Oct. 25, 2017 (JP) .................................. 2017-205965

(51) Int. Cl.
| | |
|---|---|
| *F16H 57/04* | (2010.01) |
| *F16H 57/029* | (2012.01) |
| *F16H 13/08* | (2006.01) |
| *F16H 13/06* | (2006.01) |

(52) U.S. Cl.
CPC ......... *F16H 57/0423* (2013.01); *F16H 13/08* (2013.01); *F16H 57/029* (2013.01); *F16H 57/045* (2013.01); *F16H 57/0409* (2013.01); *F16H 57/0424* (2013.01); *F16H 57/0457* (2013.01); *F16H 57/0479* (2013.01); *F16H 57/0482* (2013.01); *F16H 57/0487* (2013.01); *F16H 13/06* (2013.01)

(58) Field of Classification Search
CPC ............. F16H 57/0487; F16H 57/0409; F16H 57/0479; F16H 57/0453
See application file for complete search history.

(56) References Cited

U.S. PATENT DOCUMENTS 5,505,112 A * 4/1996 Gee ...................... F16H 57/0447
180/339
6,299,561 B1 * 10/2001 Kramer ............... F16H 57/0447
184/13.1

FOREIGN PATENT DOCUMENTS

| JP | 08226510 A | * | 9/1996 | |
|---|---|---|---|---|
| JP | H09-126287 A | | 5/1997 | |
| JP | 2001065654 A | * | 3/2001 | ......... F16H 57/0463 |
| JP | 2003278867 A | * | 10/2003 | |
| JP | 2015117719 A | * | 6/2015 | |

* cited by examiner

*Primary Examiner* — Sherry L Estremsky
(74) *Attorney, Agent, or Firm* — Oliff PLC

(57) ABSTRACT

A planetary roller transmission includes: a fixed ring; a sun shaft; a plurality of planetary rollers; a carrier that has a plurality of support shafts that support the planetary rollers via bearing portions and that revolves together with the planetary rollers; and an annular flange ring provided on one side, in the axial direction, of the fixed ring and the planetary rollers. The inside diameter of the flange ring is smaller than the diameter of a circumscribed circle circumscribed by bearing portions which are arranged in the circumferential direction. An oil storage portion that receives oil that has climbed over the flange ring from the side of the planetary rollers is provided between a side surface of the flange ring and an inner wall surface of the housing. A passage that allows oil to permeate from the oil storage portion to the side of the planetary rollers is provided.

5 Claims, 4 Drawing Sheets

ONE SIDE ←——————→ OTHER SIDE
AXIAL DIRECTION

ONE SIDE ← AXIAL DIRECTION → OTHER SIDE

PLANETARY ROLLER TRANSMISSION

INCORPORATION BY REFERENCE

The disclosure of Japanese Patent Application No. 2017-205965 filed on Oct. 25, 2017 including the specification, drawings and abstract, is incorporated herein by reference in its entirety.

BACKGROUND OF THE INVENTION

1. Field of the Invention

The present invention relates to a planetary roller transmission.

2. Description of the Related Art

Planetary roller transmissions are widely used because they are silent, produce little rotational fluctuations, cause no backlash, etc. compared to planetary gear transmissions. A grease sealing type (grease lubrication type) and an oil bath type (oil lubrication type) are known as lubrication types of the planetary roller transmissions.

In the case where the planetary roller transmission is used as a speed increaser in which an output shaft rotates at a relatively high speed, the oil bath type which is not likely to cause insufficient lubrication is often adopted. In the oil bath type, an O-ring, a gasket, or the like is used between a lid portion and a housing body portion of a lidded housing that houses planetary rollers etc., and oil seals or the like are used around an input shaft and the output shaft, preventing leakage of oil to the outside. Japanese Patent Application Publication No. 9-126287 (JP 9-126287 A) discloses a transmission of an oil bath type.

In a planetary roller transmission of the oil bath type, as illustrated in FIG. 4, oil is stored in a housing 90. When the transmission operates, planetary rollers 91 sequentially pass in the stored oil. Therefore, in the case where the planetary roller transmission of the oil bath type is used for high-speed rotation, in particular, oil is frequently stirred by the planetary rollers 91, which increases the stirring resistance and occasionally raises the temperature of the transmission. In order to reduce the resistance to stirring of oil, the amount of oil stored in the housing 90 may be reduced. In this case, however, the planetary rollers 91 and bearing portions 92 provided on the inner peripheral side of the planetary rollers 91 are brought into a poor lubrication state soon when oil is consumed. As a result, the rotational resistance may be increased, and a temperature rise and abnormal wear may be caused by friction.

SUMMARY OF THE INVENTION

It is an object of the present invention to provide a planetary roller transmission that can reduce the resistance to stirring of oil by planetary rollers and prevent shortage of oil.

An aspect of the present invention provides a planetary roller transmission including: a lidded housing; a fixed ring provided in the housing with a central axis extending horizontally; a sun shaft provided on an inner side, in a radial direction, of the fixed ring concentrically with the fixed ring; a plurality of planetary rollers interposed between the fixed ring and the sun shaft; a carrier that has a plurality of support shafts that support the planetary rollers via bearing portions and that revolves together with the plurality of planetary rollers; and an annular flange ring provided on one side, in an axial direction, of the fixed ring and the planetary rollers, in which: an inside diameter of the flange ring is smaller than a diameter of a circumscribed circle circumscribed by the plurality of bearing portions which are arranged in a circumferential direction; an oil storage portion that receives oil that has climbed over the flange ring from a side of the planetary rollers is provided between a side surface of the flange ring and an inner wall surface of the housing; and a passage that allows oil to permeate from the oil storage portion to the side of the planetary rollers is provided.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
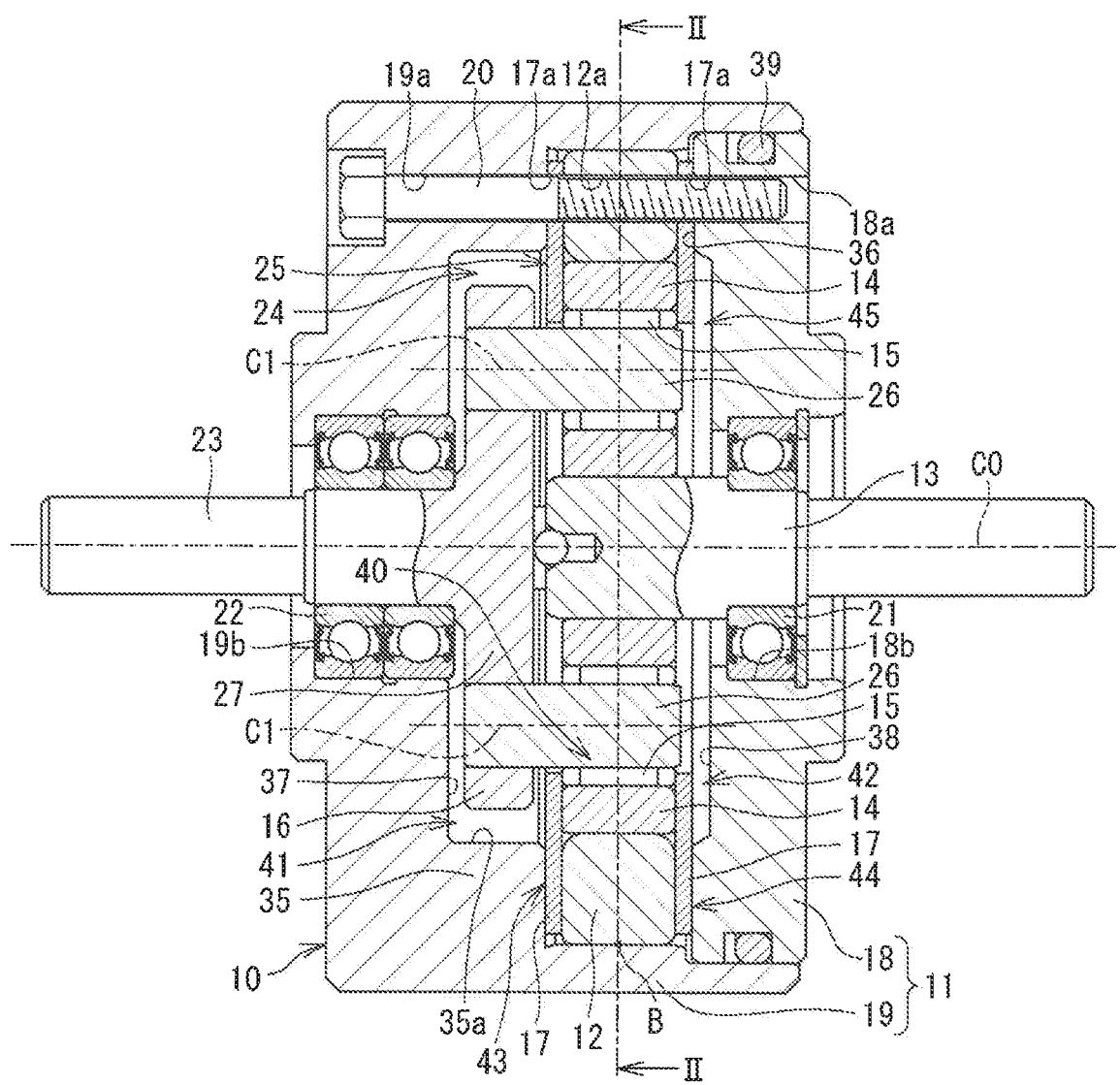
FIG. 1 is a vertical sectional view illustrating an example of a planetary roller transmission according to the present invention.
Figure 2:
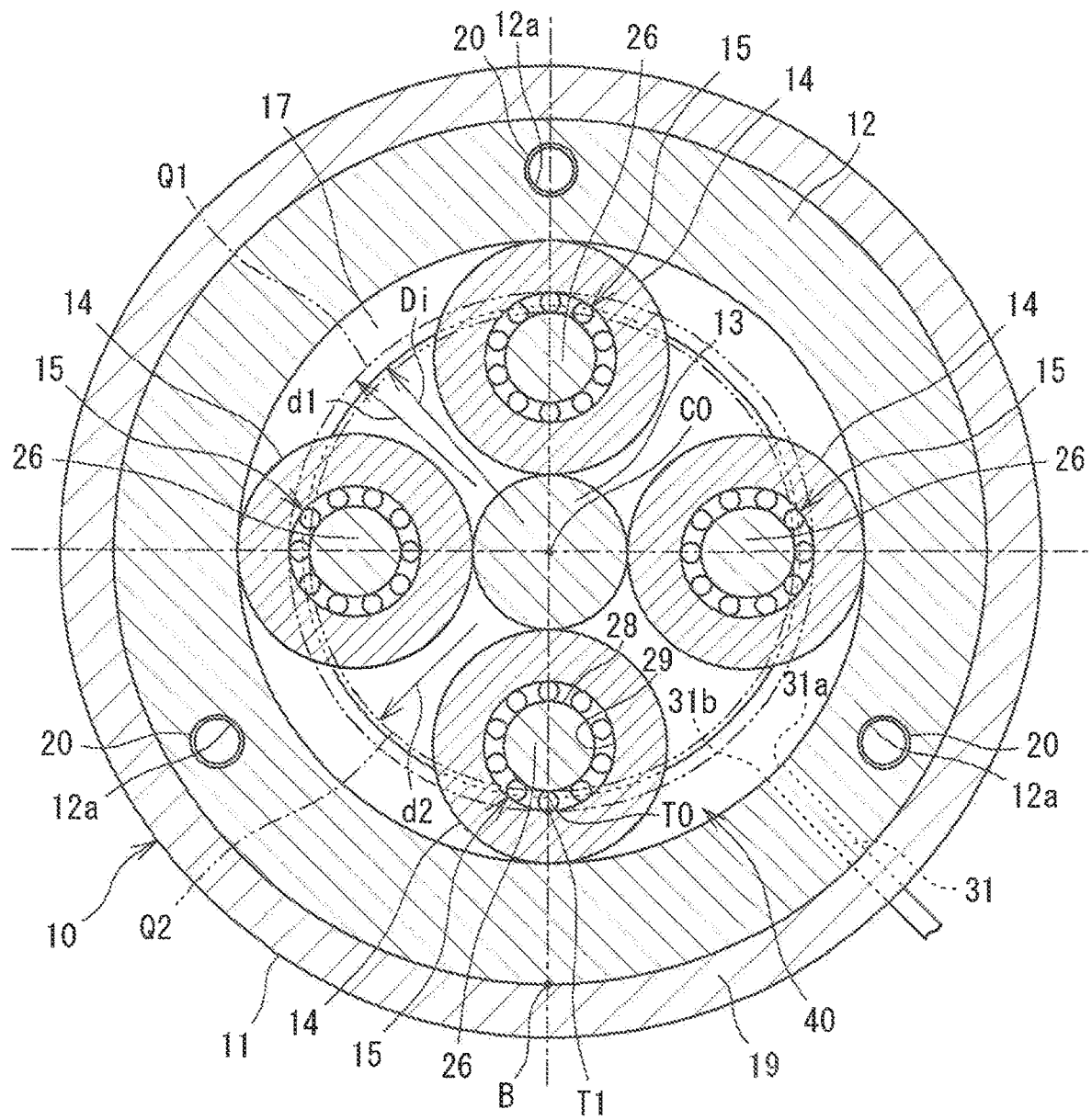
FIG. 2 is a sectional view taken along the line II-II of FIG. 1.

FIG. 1 is a vertical sectional view illustrating an example of a planetary roller transmission according to the present invention. FIG. 2 is a sectional view taken along the line II-II of FIG. 1. A planetary roller transmission 10 (hereinafter referred to as a "transmission 10") is a device that outputs rotation of a motor, for example, with the speed of the rotation varied. In the description of the present embodiment, the transmission 10 is used as a speed increaser that increases the speed of rotation of an input shaft (rotary shaft 23). However, the transmission 10 can also be used as a speed reducer that has the rotary shaft 23 as an output shaft.

The transmission 10 includes a lidded housing 11, a fixed ring 12, a sun shaft 13, planetary rollers 14, a carrier 16, and flange rings 17. The transmission 10 according to the present embodiment includes the rotary shaft 23 (see FIG. 1). The rotary shaft 23 is integral with the carrier 16. In the following description, the central axis of the fixed ring 12 and the respective central axes of the sun shaft 13 and the rotary shaft 23 are collinear with each other, and such central axes are on a central axis C0 of the transmission 10. The direction which is parallel to the central axis C0 is referred to as the "axial direction". The direction which is orthogonal to the central axis C0 is referred to as the "radial direction". The direction of rotation about the central axis C0 is referred to as the "circumferential direction".

In FIG. 1, the lidded housing 11 has a lid portion 18 in a disk shape and a housing body portion 19 in a bottomed tubular shape. The lid portion 18 and the housing body portion 19 are coupled by a plurality of bolts 20 inserted in the axial direction to be integrated with each other. The lid portion 18 and the housing body portion 19 are formed with holes 18a and holes 19a, respectively, for insertion of the bolts 20. A first space portion 24 in a circular shape and a second space portion 25 in a circular shape that is larger in inside diameter than the first space portion 24 are formed inside the housing body portion 19. Therefore, a stepped annular portion 35 is formed in the housing body portion 19 on the outer side, in the radial direction, of the first space portion 24 and one side, in the axial direction, of the second space portion 25. A surface on one side, in the axial direction, of the first space portion 24 is an inner wall surface 37 on one side (on the side of the housing body portion 19), in the axial direction, of the housing 11. A third space portion 45 in a circular shape is formed inside the lid portion 18. The third space portion 45 is a region recessed from a side surface 36 of the lid portion 18 toward the other side in the axial direction. A surface on the other side, in the axial direction, of the third space portion 45 is an inner wall surface 38 on the other side (on the side of the lid portion 18), in the axial direction, of the housing 11.

The fixed ring 12 is a ring-shaped member, and is provided in the housing 11 with the central axis (C0) extending horizontally. That is, the transmission 10 is installed in the posture illustrated in FIG. 1. The term "horizontally" covers not only an aspect in which the central axis (C0) extends strictly horizontally, but also a case where the central axis (C0) is inclined (for example, within 10 degrees) with respect to a horizontal line.

The flange rings 17 are each constituted of a ring-shaped plate member. In the present embodiment, the flange rings 17 are provided on both sides, in the axial direction, of the fixed ring 12. The outside diameter of the flange rings 17 is smaller than the outside diameter of the fixed ring 12. Meanwhile, the inside diameter of the flange rings 17 is smaller than the inside diameter of the fixed ring 12.

The flange rings 17 are provided in the housing 11 together with the fixed ring 12 with the central axis of the flange rings 17 coinciding with the central axis of the fixed ring 12. The fixed ring 12 and the pair of flange rings 17, 17 are provided in the second space portion 25, and interposed between the lid portion 18 and the housing body portion 19 (stepped annular portion 35). The fixed ring 12 is formed with holes 12a for insertion of the bolts 20. The flange rings 17 are formed with holes 17a for insertion of the bolts 20. By tightening the bolts 20, the fixed ring 12 and the pair of flange rings 17 are clamped between the lid portion 18 and the housing body portion 19 (stepped annular portion 35) in the axial direction.

The sun shaft 13 is provided concentrically with the fixed ring 12 on the inner side, in the radial direction, of the fixed ring 12. A through hole 18b is formed in the center of the lid portion 18. A rolling bearing 21 with a seal is provided in the through hole 18b. The sun shaft 13 is rotatably supported by the rolling bearing 21.

A plurality of (four in the illustrated example) planetary rollers 14 are interposed between the fixed ring 12 and the sun shaft 13. The planetary rollers 14 are disposed at equal intervals along the circumferential direction. The planetary rollers 14 are pressed against the inner peripheral surface of the fixed ring 12 and the outer peripheral surface of a part of the sun shaft 13. The planetary rollers 14 are each constituted of a cylindrical member. The axial dimension of the planetary rollers 14 is slightly smaller than the axial dimension of the fixed ring 12. A part of the planetary rollers 14 is positioned between the pair of flange rings 17, 17. Consequently, movement of the planetary rollers 14 in the axial direction is restricted by the flange rings 17, 17.

The carrier 16 has support shafts 26 that rotatably support the planetary rollers 14 via bearing portions 15. The number of the support shafts 26 is the same as that of the planetary rollers 14. The carrier 16 has a disk portion 27 that supports the support shafts 26. The support shafts 26 are each a circular column member fixed to the disk portion 27, and project in the axial direction from the disk portion 27. The flange ring 17 (first flange ring 17) on one side in the axial direction is provided between the disk portion 27 of the carrier 16 and the fixed ring 12 and the planetary rollers 14 on the inner peripheral side of the fixed ring 12. As illustrated in FIG. 1, the first space portion 24 which is formed in the housing 11 (housing body portion 19) serves as a space in which the disk portion 27 of the carrier 16 is provided. A part (bottom portion) of the first space portion 24 is used as a first oil storage portion 41 to be discussed later. The flange ring 17 (second flange ring 17) on the other side in the axial direction is provided between the fixed ring 12 and the planetary rollers 14 on the inner peripheral side of the fixed ring 12 and the lid portion 18.

Figure 3:
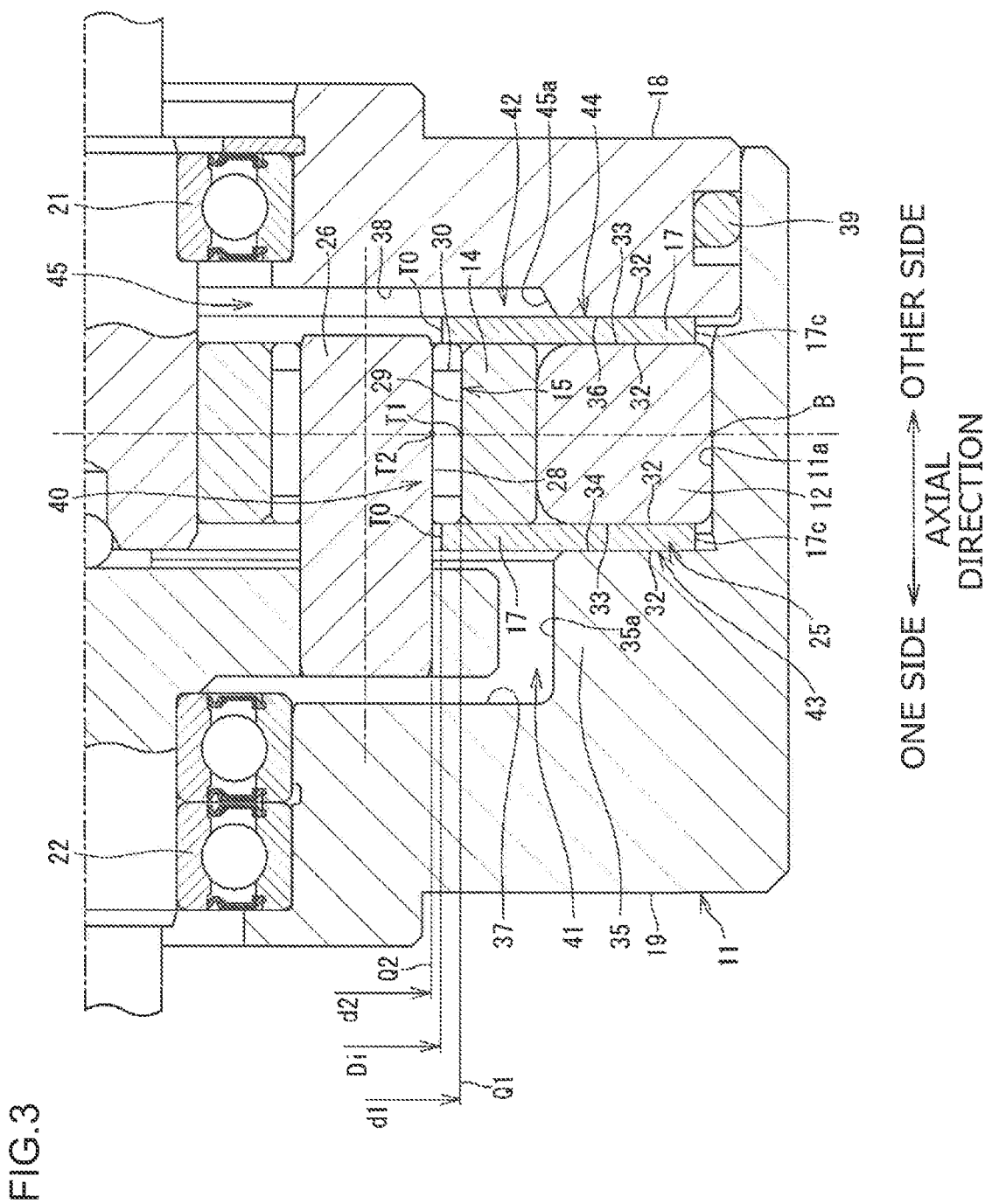
FIG. 3 is a sectional view illustrating, as enlarged, the lower part of the transmission illustrated in FIG. 1.
Figure 4:
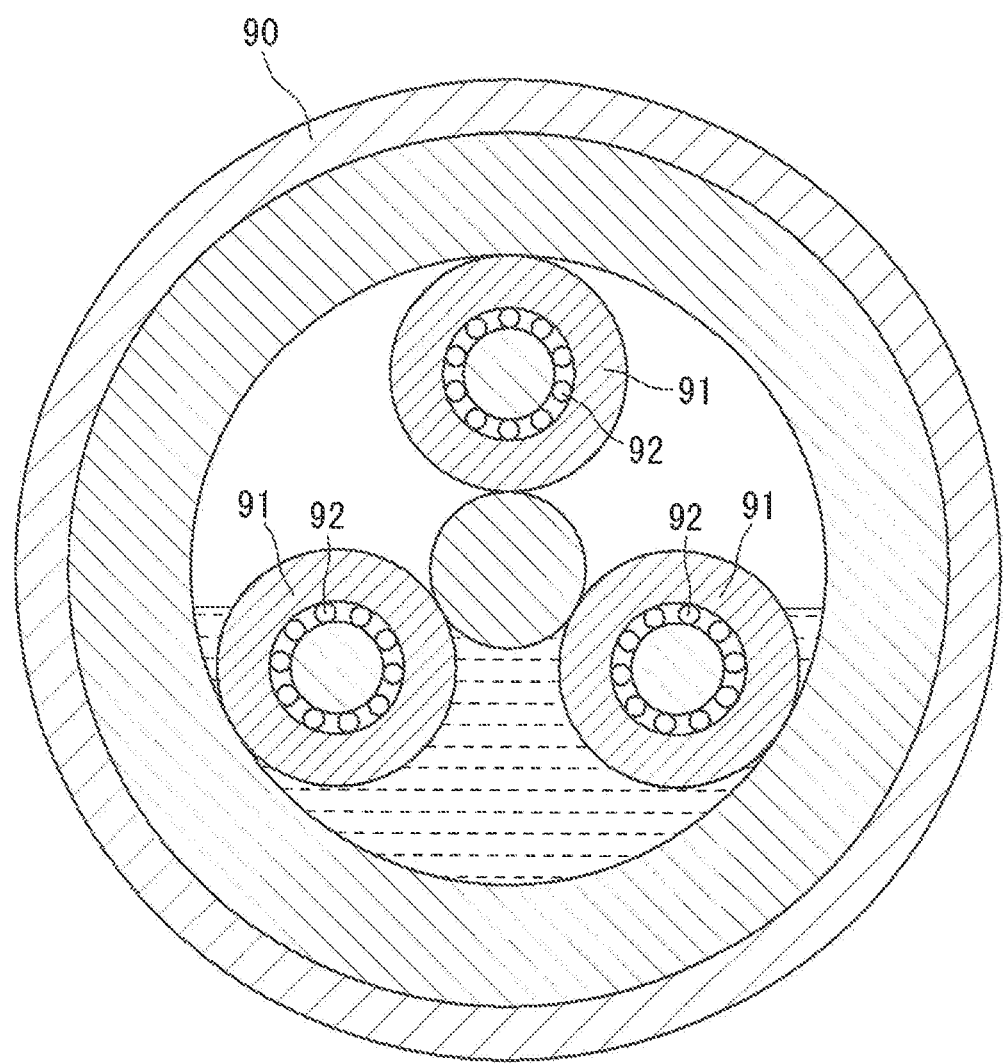
FIG. 4 is a transverse sectional view of a planetary roller transmission of an oil bath type according to the related art.

FIG. 3 is a sectional view illustrating, as enlarged, the lower part of the transmission 10 illustrated in FIG. 1. The bearing portion 15 is interposed between the support shaft 26 and the planetary roller 14. The bearing portion 15 according to the present embodiment is a rolling bearing constituted with a plurality of needle rollers 30 interposed between a first track surface 28, which is the outer peripheral surface of the support shaft 26, and a second track surface 29, which is the inner peripheral surface of the planetary roller 14. The bearing portion 15 may be configured differently from that illustrated in the drawing, and may be configured to have a bearing ring that is separate from the support shaft 26 and the planetary roller 14 as a member that makes rolling contact with the rollers 30 although not illustrated. Since four planetary rollers 14 are present at equal intervals in the circumferential direction (see FIG. 2), the bearing portions 15 which are provided on the inner peripheral side of the planetary rollers 14 are also present at equal intervals in the circumferential direction. Therefore, as described later, a circumscribed circle (first circumscribed circle Q1) circumscribed by the plurality of (four) bearing portions 15 which are arranged in the circumferential direction is defined. Meanwhile, since the support shafts 26 which support the planetary rollers 14 via the bearing portions 15 are present at equal intervals in the circumferential direction, a circumscribed circle (second circumscribed circle Q2) circumscribed by the plurality of (four) support shafts 26 is defined.

As illustrated in FIG. 1, the carrier 16 is constituted integrally with the rotary shaft 23. The rotary shaft 23 is provided coaxially with the central axis C0 on one side, in the axial direction, of the sun shaft 13. A through hole 19b is formed in the center of the housing body portion 19. The through hole 19b is provided with a rolling bearing 22 with seals. The rotary shaft 23 is rotatably supported by the rolling bearing 22.

In the transmission 10 configured as described above, when the sun shaft 13 is rotated about the central axis C0, the planetary rollers 14 revolve about the central axis C0 while rotating about the central axes C1 of the support shafts 26 because of a friction force between the sun shaft 13 and the planetary rollers 14 and a friction force between the planetary rollers 14 and the fixed ring 12. The planetary rollers 14 and the bearing portions 15 on the inner peripheral side of the planetary rollers 14 rotate (revolve) about the central axis C0. Consequently, the carrier 16 rotates (revolves) about the central axis C0 together with the planetary rollers 14 and the bearing portions 15. Since the carrier 16 is integral with the rotary shaft 23, the rotary shaft 23 rotates about the central axis C0. In the manner described above, the rotational force of the sun shaft 13 is transferred to the rotary shaft 23 with the speed of the rotation varied.

The flange rings 17 will be further described. The first flange ring 17 and the second flange ring 17 have the same shape. The flange rings 17 are each constituted of a ring-shaped plate member. As illustrated in FIG. 2, an inside diameter Di of the flange rings 17 is smaller than a diameter d1 of the "first circumscribed circle Q1" which is defined as follows (Di<d1).

"First circumscribed circle Q1": a circumscribed circle circumscribed by the plurality of (four) bearing portions 15 which are arranged in the circumferential direction. In addition, the inside diameter Di of the flange rings 17 is larger than a diameter d2 of the "second circumscribed circle Q2" which is defined as follows (Di>d2).

"Second circumscribed circle Q2": a circumscribed circle circumscribed by the plurality of (four) support shafts 26.

Hence, the relationship "d2<Di<d1" is met. Since the inside diameter Di of the flange rings 17 is larger than the diameter d2 of the second circumscribed circle Q2, the four support shafts 26 of the carrier 16 penetrate the inner peripheral side of the flange rings 17.

FIG. 3 illustrates, as enlarged, the lower part of the transmission 10 illustrated in FIG. 1, particularly illustrating a sectional surface that includes a lowest position B of the second space portion 25 of the housing 11. The sectional surface in FIG. 3 includes a lowest position T0 (hereinafter referred to as a "lowest inner peripheral position T0 of the flange rings 17") of the inner peripheral surfaces of the flange rings 17. In addition, FIG. 3 illustrates a state in which the planetary roller 14, the bearing portion 15, and the support shaft 26 have reached the lowest position.

According to the above definition, the first circumscribed circle Q1 passes through a part of the inner peripheral surface (second track surface 29) of the planetary roller 14. According to the above definition, the second circumscribed circle Q2 passes through a part of the outer peripheral surface (first track surface 28) of the support shaft 26. Thus, as illustrated in FIG. 3, the lowest inner periphery position T0 of the flange rings 17 is higher than a "first position T1" defined as follows and lower than a "second position T2" defined as follows.

"First position T1": the lowest position of the inner peripheral surface (second track surface 29) of the planetary roller 14 which has reached the lowest position "Second position T2": the lowest position of the outer peripheral surface (first track surface 28) of the support shaft 26 which has reached the lowest position Components around the flange rings 17 will be described. As described earlier, the pair of flange rings 17, 17 and the fixed ring 12 between the pair of flange rings 17, 17 are clamped between the housing body portion 19 (stepped annular portion 35) and the lid portion 18. Of the fixed ring 12, the pair of flange rings 17, 17, the housing body portion 19, and the lid portion 18, adjacent members contact each other in the axial direction. Side surfaces 32, 32 on both sides of the flange rings 17 are rough surfaces (e.g. cut surfaces), rather than mirror-finished surfaces. Side surfaces 33, 33 on both sides of the fixed ring 12, a side surface 34 of the stepped annular portion 35, and a side surface 36 of the lid portion 18 are also rough surfaces (e.g. cut surfaces), rather than mirror-finished surfaces. Therefore, oil can permeate to pass between the first flange ring 17 and the stepped annular portion 35, and oil can also permeate to pass between the first flange ring 17 and the fixed ring 12. Oil that has permeated between the first flange ring 17 and the stepped annular portion 35 to flow radially outward can permeate radially inward between the first flange ring 17 and the fixed ring 12 by way of a space between an outer peripheral surface 17c of the first flange ring 17 and an inner peripheral surface 11a of the housing 11. In this manner, a space between contact surfaces of the first flange ring 17 and the stepped annular portion 35 and a space between contact surfaces of the first flange ring 17 and the fixed ring 12 serve as a part of a passage 43 through which oil can permeate. In addition, oil can permeate to pass between the second flange ring 17 and the lid portion 18. Oil can also permeate to pass between the second flange ring 17 and the fixed ring 12. Oil that has permeated between the second flange ring 17 and the lid portion 18 to flow radially outward can permeate radially inward between the second flange ring 17 and the fixed ring 12 by way of a space between an outer peripheral surface 17c of the second flange ring 17 and the inner peripheral surface 11a of the housing 11. In this manner, a space between contact surfaces of the second flange ring 17 and the lid portion 18 and a space between contact surfaces of the second flange ring 17 and the fixed ring 12 serve as a part of a passage 44 through which oil can permeate.

Lubrication of the transmission 10 is of the oil bath type (oil lubrication type). That is, oil is stored in the lidded housing 11. This oil is used to lubricate the planetary rollers 14, the bearing portions 15, and so forth. Oil is supplied into the housing 11 from a supply port (not illustrated) provided in the upper part (upper-half region) of the housing 11, and stored in the lower part (lower-half region) of the housing 11. An O-ring 39 (see FIGS. 1 and 3) is provided between the lid portion 18 and the housing body portion 19 to prevent oil in the housing 11 from leaking to the outside.

As illustrated in FIG. 3, the region in which oil is stored is divided by the flange rings 17 into a region (hereinafter referred to as a "passage region 40") through which the planetary rollers 14 and the bearing portions 15 on the inner peripheral side of the planetary roller 14 pass, and other regions (the first oil storage portion 41 and a second oil storage portion 42). The passage region 40 according to the present embodiment is a region between the pair of flange rings 17, 17. The first oil storage portion 41 is a region between the side surface 32 on one side, in the axial direction, of the first flange ring 17 and the inner wall surface 37 of the housing body portion 19. The bottom portion of an inner peripheral surface 35a of the stepped annular portion 35 serves as the bottom surface of the first oil storage portion 41. The diameter of the inner peripheral surface 35a is larger than the inside diameter Di of the flange rings 17. Consequently, the bottom surface of the first oil storage portion 41 is lower than the lowest inner periphery position T0 of the flange rings 17 in the sectional surface illustrated in FIG. 3. The second oil storage portion 42 is a region between the side surface 32 on the other side, in the axial direction, of the second flange ring 17 and the inner wall surface 38 of the lid portion 18. The bottom portion of an inner peripheral surface 45a of the third space portion 45 serves as the bottom surface of the second oil storage portion 42. The diameter of the inner peripheral surface 45a is larger than the inside diameter Di of the flange rings 17. Consequently, the bottom surface of the second oil storage portion 42 is lower than the lowest inner periphery position T0 of the flange rings 17 in the sectional surface illustrated in FIG. 3.

As illustrated in FIG. 2, an oil discharge hole 31 is provided in the lower part of the housing 11. The oil discharge hole 31 opens in the housing 11 (first space portion 24; see FIG. 1) in a part of the lower-half region of the housing 11. As illustrated in FIG. 2, the oil discharge hole 31 is provided so as to extend continuously from an opening 31a toward a lower position. The liquid surface of oil is not as high as or higher than the opening 31a, and excessive oil naturally flows downward through the oil discharge hole 31 to be discharged to the outside of the housing 11. Oil discharged to the outside is received by an oil pan or the like (not illustrated), for example.

In FIG. 3, when the transmission 10 is stopped, oil supplied into the housing 11 is stored up to a liquid surface at the same height in the first oil storage portion 41, the passage region 40, and the second oil storage portion 42. In this state, the liquid surface of oil is at the height of the opening 31a of the oil discharge hole 31 (see FIG. 2).

As illustrated in FIG. 2, a lowest position 31b (hereinafter referred to as a "lowest opening position 31b") of the opening 31a of the oil discharge hole 31 is as high as or higher than the lowest position of the first circumscribed circle Q1. The lowest position of the first circumscribed circle Q1 corresponds to the lowest position of the inner peripheral surface (second track surface 29) of the planetary roller 14 which has reached the lowest position, that is, the first position T1. Hence, the liquid surface of oil is as high as or higher than the first position T1. In this manner, the oil discharge hole 31 is configured to open at the same height as a region on the lower side of the passage region 40 through which the bearing portions 15 pass in the case where the planetary rollers 14 revolve. Therefore, stored oil can adhere to the planetary rollers 14 and the bearing portions 15, securing lubrication of the planetary rollers 14 and the bearing portions 15.

When the transmission 10 operates, oil between the pair of flange rings 17, 17 (in the passage region 40) is splashed by the planetary rollers 14 and the bearing portions 15 to reach the first oil storage portion 41 and the second oil storage portion 42. The first oil storage portion 41 can receive oil that has climbed over the first flange ring 17 from the side of the passage region 40 in which the planetary rollers 14 are present. The second oil storage portion 42 can receive oil that has climbed over the second flange ring 17 from the side of the passage region 40 in which the planetary rollers 14 are present.

The position of the opening 31a of the oil discharge hole 31 will be further described. As illustrated in FIGS. 2 and 3, the lowest opening position 31b of the opening 31a of the oil discharge hole 31 is as high as or higher than the lowest position (T1) of the first circumscribed circle Q1 as described earlier. Alternatively, the lowest opening position 31b may be at the same height as the lowest inner periphery position T0 (see FIG. 3) of the flange ring 17, or lower than the lowest inner periphery position T0. In consideration of consumption of oil or the like, the lowest opening position 31b may be as high as or lower than a position several millimeters above the lowest inner periphery position T0.

In the transmission 10 (see FIG. 3) configured as described above, the first oil storage portion 41 which receives oil that has climbed over the first flange ring 17 from the side of the planetary rollers 14 is provided between the side surface 32 of the first flange ring 17 and the inner wall surface 37 of the housing 11 (housing body portion 19). Therefore, when the transmission 10 starts operation and the planetary rollers 14 revolve, oil that is present at the bottom portion of the passage region 40 of the planetary rollers 14 is splashed as described earlier, and climbs over the first flange ring 17 to be stored in the first oil storage portion 41. In contrast, there is not much oil in the passage region 40 for the planetary rollers 14, and the liquid surface of oil between the pair of flange rings 17, 17 (in the passage region 40) is lowered. As described earlier, the inside diameter Di of the flange rings 17 is smaller than the diameter d1 of the first circumscribed circle Q1 which is circumscribed by the plurality of bearing portions 15 which are arranged in the circumferential direction (Di<d1). Therefore, oil stored in the first oil storage portion 41 is blocked by the first flange ring 17, and cannot be returned to the bottom portion of the passage region 40 for the planetary rollers 14 immediately. Consequently, a state in which there is not much oil in the passage region 40 for the planetary rollers 14 is maintained during operation of the transmission 10. Therefore, it is possible to reduce the resistance to stirring of oil by the planetary rollers 14 when the transmission 10 operates. The transmission 10 is provided with the passage 43 which allows oil to permeate from the first oil storage portion 41 to the side of the planetary rollers 14. Therefore, when operation of the transmission 10 is stopped, oil in the first oil storage portion 41 can be gradually returned to the side of the planetary rollers 14 (passage region 40) through the passage 43. As a result, the liquid surface of oil between the pair of flange rings 17, 17 is raised when operation of the transmission 10 is stopped. In addition, when oil in the passage region 40 is decreased significantly, oil in the first oil storage portion 41 can be gradually returned to the side of the planetary rollers 14 (passage region 40) through the passage 43, even if operation of the transmission 10 is not stopped. Hence, it is possible to reduce the resistance to stirring of oil by the planetary rollers 14 during operation of the transmission 10, and to prevent shortage of oil at the planetary rollers 14 and the bearing portions 15 by virtue of oil returning to the passage region 40.

In the present embodiment, in addition, the flange ring (second flange ring) 17 is provided also on the other side, in the axial direction, of the fixed ring 12 and the planetary rollers 14 on the inner peripheral side of the fixed ring 12. The second oil storage portion 42 which receives oil that has climbed over the second flange ring 17 from the side of the planetary rollers 14 is provided between the side surface 32 of the second flange ring 17 and the inner wall surface 38 of the lid portion 18 of the housing 11. Therefore, as on the side of the first flange ring 17, when oil between the pair of flange rings 17, 17 is splashed by the planetary rollers 14 etc. to climb over the second flange ring 17, the oil can be moved to the second oil storage portion 42. Then, oil in the second oil storage portion 42 can be gradually returned to the side of the planetary rollers 14 (passage region 40) through the passage 44.

In the transmission 10 (see FIG. 2) according to the present embodiment, in addition, the housing 11 is provided with the oil discharge hole 31. The oil discharge hole 31 opens at the same height as a region on the lower side of the passage region 40 through which the bearing portions 15 pass in the case where the planetary rollers 14 revolve. Therefore, extra oil is discharged to the outside from the oil discharge hole 31 even if excessive oil is supplied into the housing 11. Since the oil discharge hole 31 opens at the height defined above, moreover, oil can be present in the passage region 40 for the bearing portions 15 when the transmission 10 is stopped or the like, securing the performance to lubricate the bearing portions 15 and the planetary rollers 14.

In the transmission 10, in addition, the liquid surface of oil is as high as or lower than the opening 31a of the oil discharge hole 31 in the housing 11. Thus, in the present embodiment, all the holes 18a, 19a (see FIG. 1) which are formed for the bolts 20 in the lid portion 18 and the housing body portion 19, respectively, and the holes 12a (see FIG. 2) which are formed for the bolts 20 in the fixed ring 12 are provided at positions above the opening 31a of the oil discharge hole 31. Such a configuration can be obtained by disposing three bolts 20 at equal intervals as illustrated in FIG. 2. With this configuration, there is no need for seal members that prevent oil from leaking to the outside from the holes 12a, 18a, 19a for the bolts 20.

In the present embodiment (see FIG. 3), in addition, a space between contact surfaces of the housing 11 (housing body portion 19) and the first flange ring 17 and a space between contact surfaces of the first flange ring 17 and the fixed ring 12 serve as a part of the passage 43 for oil to allow the oil to permeate. In addition, a space between contact surfaces of the housing 11 (lid portion 18) and the second flange ring 17 and a space between contact surfaces of the second flange ring 17 and the fixed ring 12 each serve as a part of the passage 44 for oil to allow the oil to permeate. With this configuration, when operation of the transmission 10 is stopped, for example, oil in each of the oil storage portions 41, 42 can be gradually returned to the side of the planetary rollers 14 through the passages 43, 44. Oil that has been returned to the side of the planetary rollers 14 is used to lubricate the planetary rollers 14 and the bearing portions 15. Therefore, it is possible to prevent shortage of oil at the planetary rollers 14 and the bearing portions 15.

In the embodiment described above, the flange rings 17 are provided on both sides, in the axial direction, of the fixed ring 12 and the planetary rollers 14. However, the flange ring 17 may be provided on only one side in the axial direction, for example.

The embodiment disclosed above is exemplary in all respects, and is not limiting. That is, the transmission according to the present invention is not limited to the illustrated embodiment, and may be in other embodiments without departing from the scope of the present invention. For example, in the embodiment described above, four planetary rollers 14 are disposed around the sun shaft 13. However, the number of the planetary rollers 14 is changeable.

According to the present invention, it is possible to reduce the resistance to stirring of oil by planetary rollers, and to prevent shortage of oil.

What is claimed is:

1. A planetary roller transmission comprising:
   a lidded housing;
   a fixed ring provided in the housing with a central axis extending horizontally;
   a sun shaft provided on an inner side, in a radial direction, of the fixed ring concentrically with the fixed ring;
   a plurality of planetary rollers interposed between the fixed ring and the sun shaft;
   a carrier that has a plurality of support shafts that support the planetary rollers via bearing portions and that revolves together with the plurality of planetary rollers; and
   an annular flange ring provided on one side, in an axial direction, of the fixed ring and the planetary rollers, wherein:
   an inside diameter of the flange ring is smaller than a diameter of a circumscribed circle circumscribed by the plurality of bearing portions which are arranged in a circumferential direction;
   an oil storage portion that receives oil that has climbed over the flange ring from a side of the planetary rollers is provided between a side surface of the flange ring and an inner wall surface of the housing; and
   a passage that allows oil to permeate from the oil storage portion to the side of the planetary rollers is provided
   the housing is provided with an oil discharge hole that discharges oil to an outside, the oil discharge hole opening at the same height as a region on a lower side of a passage region through which the bearing portions pass in the case where the planetary rollers revolve.

2. The planetary roller transmission according to claim 1, wherein:
   the lidded housing has a lid portion and a housing body portion coupled to each other by a plurality of bolts inserted in the axial direction; and
   all holes formed for the bolts in the lid portion and the housing body portion are provided at positions above an opening of the oil discharge hole.

3. The planetary roller transmission according to claim 1, wherein
   a space between contact surfaces of the housing and the flange ring and a space between contact surfaces of the flange ring and the fixed ring are used as a part of the passage to allow oil to permeate.

4. The planetary roller transmission according to claim 1, wherein:
   the carrier has a disk portion that supports the support shafts which project in the axial direction; and
   the flange ring is provided between the fixed ring and the planetary rollers and the disk portion, and the inside diameter of the flange ring is larger than a diameter of a circumscribed circle circumscribed by the plurality of support shafts.

5. The planetary roller transmission according to claim 1, wherein
   the flange ring is provided also on the other side, in the axial direction, of the fixed ring and the planetary rollers, and a second oil storage portion that receives oil that has climbed over the flange ring from a side of the planetary rollers is provided between a side surface of the flange ring and an inner wall surface of the housing.

* * * * *